United States Patent [19]

Bekbulatov et al.

[11] 4,187,368
[45] Feb. 5, 1980

[54] PROCESS FOR PRODUCING POWER-LIKE FURAN RESIN

[76] Inventors: Ildgam A. Bekbulatov, ulitsa Kashkarskaya, 215; Juldash Mamatov, ulitsa Pushkina, 50, kv. 60; Gennady D. Varlamov, ulitsa Jubileinaya, 5, kv. 13; Shavkat Madaliev, ulitsa Yarmazar, 361; Valery M. Gaibov, ulitsa Turgeneva, 19, kv. 44, all of Fergana, U.S.S.R.

[21] Appl. No.: 919,279

[22] Filed: Jun. 26, 1978

[30] Foreign Application Priority Data

Jun. 29, 1977 [SU] U.S.S.R. .............................. 2513610
Aug. 2, 1977 [SU] U.S.S.R. .............................. 2517037
Apr. 5, 1978 [SU] U.S.S.R. .............................. 2593551

[51] Int. Cl.$^2$ .......................... C08G 8/02; C08G 8/06; C08G 8/28
[52] U.S. Cl. .................................. 525/503; 264/331; 528/126; 528/127; 528/139; 528/157; 528/158; 525/480; 525/504
[58] Field of Search ............... 528/127, 130, 131, 132, 528/158, 139, 157, 126

[56] References Cited

U.S. PATENT DOCUMENTS

| | | | |
|---|---|---|---|
| 1,591,999 | 10/1924 | Redman | 528/131 X |
| 1,716,665 | 6/1929 | Redman et al. | 528/131 X |
| 2,561,814 | 7/1951 | Novotny et al. | 528/131 X |
| 2,600,403 | 6/1952 | Harvey | 260/828 X |
| 2,776,266 | 1/1957 | Harvey | 260/828 X |
| 2,803,618 | 8/1957 | Harvey | 260/828 X |
| 2,970,121 | 1/1961 | Schmittberger | 528/131 X |
| 3,074,972 | 1/1963 | Harvey et al. | 528/127 X |
| 3,725,333 | 4/1973 | Adkins et al. | 528/132 X |
| 4,051,301 | 9/1977 | Laitar | 528/132 X |

*Primary Examiner*—Howard E. Schain
*Attorney, Agent, or Firm*—Lackenbach, Lilling & Siegel

[57] ABSTRACT

For the production of a powder-like furan resin use is made of a mixture of a ketone pertaining to the furan series, phenol-formaldehyde resin and, if desired, furfurol taken in a weight ratio of 10:3–15:2–5 respectively. The mixture of said components is heated to a temperature within the range of from 130° to 200° C., whereupon the desired product is formed. The process may be conducted in the presence of a catalyst comprising a mixture of tin dichloride and hexamethylene diamine.

The resulting powder-like furna resin is resistant against highly-aggressive media at a temperature of up to 120° C.; it is also resistant against the effect of oxidizing agents at a temperature of up to 80° C. Martens yield temperature of the powder-like furna resin of the present invention is as high as 300° C. The resin yield is as high as 93%.

10 Claims, No Drawings

PROCESS FOR POWER-LIKE FURAN RESIN

The present invention relates to processes for producing powder-like furna resine.

FIELD OF APPLICATION OF THE INVENTION

Furan powder-like resins are employed for the manufacture of construction parts, e.g. for heat-exchangers; protective anti-corrosion coatings (foamed plastics), in the production of structural members of electroinsulation fixture, pipelines, reactors.

Articles from powder-like compression-moulding materials based on powder-like furan resins may be manufactured by a continuous process. Protection coatings based on furan powder-like resins may be applied by the gas-flame spraying method as well as by deposition in an electrostatic field or in a fluidized bed. Manufacture of laminates and coatings with the use of a powder-like furna resin makes it possible to obviate the use of a solvent in the process.

BACKGROUND OF THE INVENTION

Known in the art are phenol-formaldehyde, polyester and epoxy resins employed as binders for the manufacture of foamed plastics, laminated plastics, graphitized plastics, compression-moulding powders, spray-deposited coatings. However, said resins do not satisfy the requirements imposed on the final articles in respect of their heat-resistance and chemical resistance. Furthermore, powder-like resinous products based on epoxy and polyester resins are rather expensive.

Known in the art is a process for producing powder-like furan resins comprising heating a ketone of the furan series such as crystalline difurfurylidene acetone at the temperature of 220° C. for 6 hours. The resulting resin is stable against the effect of aggressive media at temperatures of at most 80° C. Furthermore, Martens yield temperature of the prior art resin does not exceed 250° C. The desired product yield ensured by the prior art process is only 45 to 55%. Moreover, the resin produced by said process is not stable against oxidizing agents. The thus-produced resin is suitable only for the manufacture of a construction graphite-reinforced plastic.

Also known in the art is a process for producing powder-like furna resins comprising heating difurfurylidene acetone in a current of an inert gas at the temperature of 200° C. for the period of 4 hours. The resulting resin has but a limited resistance in respect of aggressive media; it is not resistant against oxidizing agents and its Martens yield temperature does not exceed 270° C. The desired product yield in this process is equal to 70%. This process is also suitable for the manufacture of resins for a construction graphite-reinforced plastic.

It is an object of the present invention to overcome the above-mentioned disadvantages.

It is also an object of the present invention to provide such a process which would enable the production of a powder-like furan resin possessing an increased chemical resistance relative to the effect of highly-aggressive media and oxidizing agents at elevated temperatures.

It is another object of the present to provide such a process which would make it possible to produce a powder-like furan resin possessing high yield temperature.

It is still another object of the present invention to provide such a process for producing a powder-like furan resin which would enable a high yield of the desired product.

These objects are accomplished by that in the production of a powder-like furan resin by way of heating a ketone of the furan series, in accordance with the present invention, the process is conducted at a temperature within the range of from 130° to 200° C. in the presence of a phenol-formaldehyde resin, the weight ratio between said ketone of the furane series and said phenol-formaldehyde resin is 10:3-15 respectively.

The process for producing a powder-like furan resin makes it possible to obtain a resin possessing an increased resistance to the effect of highly-aggressive media at a temperature of up to 120° C. and oxidizing agents at a temperature of up to 80° C. with a Martens yield temperature as high as 300° C. The resin yield is ensured at about 93%.

To reduce the process duration down to 1–2 hours, it is advisable to maintain the process temperature, in accordance with the present invention, within the range of from 180° to 200° C.

Besides, in accordance with the present invention it is also advisable to use, as the ketone of the furan series, monofurfurylidene acetone, difurfurylidene acetone, a mixture of monofurfurylidene acetone and difurfurylidene acetone in a ratio therebetween of from 7:3 to 7:7 respectively, difurfurylidene cyclohexanone, 1,9-di-($\alpha$-furyl)-nonanetetraen-1,3,6,8-one-5, 1,5-di-($\alpha$-furyl)-2,4-dimethylpentadien-1,4-one-3 or mixtures thereof.

The use of ketones belonging to the furane series or mixtures thereof makes it possible to perform the process for producing a furan powder-like resin of various grades thus imparting thereto a whole range of specific properties for a further processing thereof to articles. Depending on the field of application of a resin, the latter is produced with a required melting point or dropping point.

To produce a furan resin suitable for the manufacture of coatings, compression-moulded articles, construction materials in accordance with the present invention it is advisable to conduct the process at a temperature within the range of from 130° to 180° C. in the presence of furfurol at a weight ratio of the furan-series ketone, phenolformaldehyde resin and furfurol ranging from 10:3:2 to 10:15:5 respectively.

The resin produced by the process according to the present invention is stable against highly-aggressive media at elevated temperatures, its Martens yield point is as high as 320° C., and impact strength is up to 4 kgf.cm/cm$^2$.

An embodiment of the present invention resides in that the process is performed at a weight ratio of the furan-series ketone, phenolformaldehyde resin and furfurol equal to 10:5:5 respectively at the process temperature varied within the range of from 130° to 140° C.

Owing to the present invention it is now possible to produce a furan resin suitable for the production of a structural graphite-reinforced plastic, a laminated plastic.

Incorporation of furfurol into the reaction mixture makes it possible to lower the process temperature down to 130°–140° C. In accordance with the present invention, it is advisable to perform the process in the presence of 1–3% by weight of a catalyst (calculated for the weight of the starting components) comprising a mixture of tin dichloride and hexamethylene diamine employed in a weight ratio of from 7:3 to 3:7 respectively. Performance of the process in the presence of the catalyst makes it possible to reduce the process duration down to 1-3 hours.

In order to impart the property of non-inflammation or self-extinction to the resin, it is advisable to incorporate, into the starting mixture of the components, triphenylphosphate taken in a weight ratio of the ketone of the furan series of from 10:0.5 to 10:3 respectively.

To increase impact resistance of the resulting resin by 1.6 times, it is advisable, in accordance with the present invention, to conduct the process in the presence of tetraethoxysilane taken in a weight ratio to the ketone of the furane series within the range of from 10:3 to 10:6 respectively.

DETAILED DESCRIPTION OF THE INVENTION

Other objects and advantages of the present invention will now become more fully apparent from the following detailed description of the process for producing a powder-like furan resin and Examples illustrating same.

The process for producing powder-like furan resins in accordance with the present invention is based on the use of ketones belonging to the furan series, phenolformaldehyde resins and furfurol.

As the ketones of the furan series use may be made of difurfurylidene acetone, monofurfurylidene acetone, difurfurylidene cyclohexane, 1,9-di-($\alpha$-furyl)-nonane-tetraen-1,3,6,8-one-5, 1,5-di-($\alpha$-furyl)-2,4-dimethylpentadien-1,4-one-3, mixtures of said compounds such as a mixture of monofurfurylidene acetone and difurfurylidene acetone taken in equal amounts, a mixture of difurfurylidene acetone and 1,5-di-($\alpha$-furyl)-2,4-dimethyl-pentaiden-1,4-one-3, a mixture of monofurfurylidene acetone and difurfurylidene acetone taken in a weight ratio ranging from 7:3 to 7:7 respectively. For example, the mixture of monofurfurylidene acetone and difurfurylidene acetone may be prepared by mixing the starting components or by condensation of furfurol and acetone in the presence of an alkali catalyst.

The phenolformaldehyde resin employed as the starting component in the process according to the present invention comprises a product of condensation of phenol and formaldehyde in the presence of an alkali catalyst or an acidic catalyst.

The process according to the present invention makes it possible to produce, from the above-cited range of the starting compounds, resins possessing sufficiently broad range of properties which have been impossible to obtain by the hitherto-known processes.

In accordance with the process of the present invention, temperature of the process for producing a powder-like furan resin is varied within the range of from 130° to 200° C.

The use of the process temperature below 130° C. results in the production of a resin having a non-uniform composition. Its Martens yield temperature does not exceed 170°-180° C. The resin does not withstand the effect of aggressive media even at room temperature. The process temperature above 200° C. results in the production of a non-soluble and non-melting resin which does not lend itself to further processing into articles. The process of the resin production is difficult to control and gives a foamed resin with a substantial evolution of gases. The resin yield ranges from 60 to 70%.

It has been found that the preparation of a furan resin from phenolformaldehyde resin and difurfurylidene acetone by way of heating the components should be preferably conducted at a temperature within the range of from 180° to 200° C. Said starting compounds should be taken in such a weight ratio that 3 to 15 parts by weight of phenolformaldehyde resin be used for every 10 parts by weight of the ketone of the furan series. The thus-produced furan resin is a foamed plastic.

Production of the furan resin according to the present invention should be preferably performed in the presence of 1 to 3% by weight of a catalyst (as calculated for the weight of the starting components) comprising a mixture of tin dichloride and hexamethylenediamine taken in a weight ratio of from 7:3 to 3:7 respectively.

The use of the catalyst in the production of the resin makes it possible to substantially reduce the process duration. The resin produced in the presence of the catalyst has a higher mechanical strength and chemical resistance. Thus, Martens yield temperature is as high as 320° C. and impact strength is of about 4 kgf.cm/cm$^2$. Chemical resistance of the resin produced in the presence of the catalyst against aggressive media is 1.3 to 1.6 times higher than that of a resin produced without the catalyst.

The above-mentioned ratios between the catalyst components are selected with the proviso that an increased ratio of tin dichloride to hexamethylene diamine exceeding the one mentioned hereinbefore results in the formation of a refuse product and frequently in the formation of a foamed mass unsuitable for a further use, lowering said ratio between tin dichloride and hexamethylenediamine results in the formation of the final product having a low chemical resistance.

It should be noted that the furan resins produced from the above-mentioned two starting compounds in the presence of the catalyst according to the present invention may be used for the production of laminated plastics, spray-deposited coatings and have a high heat-resistance and chemical stability.

The process according to the present invention makes it possible to produce powder-like furan resins possessing, as it has been already mentioned, a high heat-resistance chemical stability and suitable for the manufacture of graphite-reinforced plastics, construction plastics, laminated plastics using three starting compounds, namely: a ketone of the furan series, a phenol formaldehyde resin and furfurol in the presence of the above-described catalyst.

It has also been found that with the use of a ketone of the furan series, phenolformaldehyde resin and furfurol taken in a weight ratio of from 10:3:2 to 10:15:5 and preferably of 10:5:5 respectively, the process should be conducted in the presence of the above-mentioned catalyst at a temperature within the range of from 130° to 180° C. and preferably from 130° to 180° C. to obtain a powder-like furan resin suitable for the manufacture of spray-deposited coatings, compression-moulding powders, structural materials.

It should be noted that the above-mentioned ratios of the starting components make it possible to produce a resin possessing predetermined properties. A higher ratio of said ketone and phenolformaldehyde resin and of the ketone and furfurol exceeding the one mentioned hereinbefore results in a lowered impact strength of the final products. The resin has an increased brittleness and becomes broken under the influence of aggressive media and elevated temperatures.

Amounts of the incorporated phenolformaldehyde resin exceeding the corresponding amounts of other components in the starting mixture result in a lowered stability of the resin in aggressive media and at an elevated temperature. The yield of the desired product is decreased to 70%.

An increased amount of the incorporated furfurol relative to other components gives a resin having impaired processability. The resin becomes tacky, sticks to parts of the comminuting and processing equipment. Chemical resistance and heat-resistance of the resulting resin are lower than those of the prior art resins.

In accordance with the present invention, it is advantageous to introduce, into the starting mixture, in addition to the above-mentioned compounds, triphenylphosphite which imparts to the resulting resin the properties of self-extinction and non-combustibility. Triphenylphosphite is added into the mixture of the starting components in an amount ensuring a weight ratio of triphenyl and the ketone of the furan series ranging from 10:0.5 to 10:3 respectively.

To increase impact strength of the furan resin, into the starting mixture of the components tetraethoxysilane should be preferably added in an amount ensuring a weight ratio thereof to the ketone of the furan series ranging from 10:3 to 10:6 respectively.

Said additives may be introduced either in combination or separately.

It has been found that the incorporated additives affect neither the process duration nor the yield of the desired product.

The powder-like furan resin produced by the process according to the present invention is resistant to highly aggressive media at a temperature of up to 120° C.; Martens yield temperature of the resulting resins is as high as 320° C., while their impact strength is up to 4 kgf.cm/cm$^2$.

EXAMPLE 1

Into a reactor provided with a stirring means, a heater and a reflux condenser there are charged 10 parts by weight of difurfurylidene acetone, 3 parts by weight of resol formaldehyde resin having Ubbelohde dropping point of 80° C. The process is conducted at the temperature of 130° C. for the period of 3 hours. The final resin is drained and cooled to the temperature of 15° C. After cooling the resin becomes a solid mass. The resin yield is 90%. Properties of the resin are shown in Table 1 hereinbelow.

To produce an article, 1 kg of dry resin produced as described hereinabove and 50 g of anhydrous iron chloride are charged into a comminuting unit and a mixture is then prepared with a required particle size. The comminuted mixture is rolled at the temperature of 120°±20° C., crushed and subjected to compression-moulding. The mass is compressed at the temperature of 200°±10° C. under the pressure of 500 kgf/cm$^2$ with the residence time of 1 minute per every mm of the article thickness. Properties of the article are shown in Table 2 hereinbelow.

EXAMPLE 2

Into a reactor similar to that described in the foregoing Example 1 there are charged 10 parts by weight of difurfurylidene acetone, 5 parts by weight of novolac phenol-formaldehyde resin with the Ubbelohde dropping point of 95° C. and 0.5 part by weight of triphenylphosphite. The process is conducted at the temperature of 180° C. for two hours. The yield of the resin is 92%. Manufacture of an article is performed following the procedure described in Example 1 hereinabove. Properties of the resin and of the article made therefrom are shown in Tables 1 and 2.

EXAMPLE 3

Into a reactor similar to that described in Example 1 there are charged 10 parts by weight of difurfurylidene acetone, 6 parts by weight of novolac phenol-formaldehyde resin with the Ubbelohde dropping point of 135° C., 30 parts by weight of triphenylphosphite, 30 parts by weight of tetraethoxysilane. The process is conducted at the temperature of 200° C. for one hour. The final resin is cooled to the temperature of 30° C. The resin yield is 93%. Manufacture of the articles is performed following the procedure of Example 1. Properties of the resin and those of the article made therefrom are shown in Tables 1 and 2 hereinbelow.

EXAMPLE 4

Into a reactor described in the foregoing Example 1 there are charged 10 parts by weight of difurfurylidene acetone, 5 parts by weight of resol phenolformaldehyde resin with the Ubbelohde dropping point of 95° C., 5 parts by weight of furfurol, 1.0 parts by weight of triphenylphosphite, 6 parts by weight of tetraethoxysilane and 3% (0.81 part by weight) as calculated for the weight of the starting components of the catalyst comprising a mixture of 3.0 parts by weight of tin dichloride and 7 parts by weight of hexamethylene diamine. The process is conducted at the temperature of 130° C. for one hour. The final resin is drained and cooled to the temperature of 20° C. The yield of the resin is 90%. Properties of the resin and of the article produced therefrom are shown in Tables 1 and 2 hereinbelow.

EXAMPLE 5

Into a reactor similar to that described in Example 1 hereinbefore there are charged 10 parts by weight of difurfurylidene acetone, 5 parts by weight of novolac phenolformaldehyde resin with the Ubbelohde dropping point of 95° C., 5 parts by weight of furfurol, 1.5 part by weight of triphenylphosphite, 3.0 parts by weight of tetraethoxysilane and 2% (0.45 parts by weight), as calculated for the weight of the starting components, of a catalyst comprising a mixture of 5.0 parts by weight of tin dichloride and 5.0 parts by weight of hexamethylenediamine. The process is conducted at the temperature of 180° C. for 0.5 hour. The final resin is drained and cooled to the temperature of 30° C. The resin yield is equal to 93%. Properties of the resin and of the article manufactured therefrom are shown in Tables 1 and 2 hereinbelow.

EXAMPLE 6

Into a reactor similar to that described in the foregoing Example 1 there are charged 10 parts by weight of novolac phenol-formaldehyde resin with the Ubbelohde dropping point of 135° C., 3.0 parts by weight of triphenylphosphite and 1% (0.23 part by weight), as calculated by weight of the starting components, of a catalyst comprising a mixture of 7.0 parts by weight of tin dichloride and 3.0 parts by weight of hexamethylenediamine. The process is conducted at the temperature of 140° C. for one hour. The final resin is drained, cooled to the temperature of 15° C. The resin yield is equal to 93%. Properties of the resin and of the articles manufactured therefrom are shown in Tables 1 and 2 hereinbelow.

EXAMPLE 7

Into a reactor similar to that described in the foregoing Example 1 there are charged 10 parts by weight of monofurfurylidene acetone, 3 parts by weight of novolac phenolformaldehyde resin with the Ubbelohde dropping point of 95° C., 2 parts by weight of furfurol and 2% (0.3 part by weight), as calculated for the weight of the starting components, of a catalyst consisting of a mixture of 5.0 parts by weight of tin dichloride and 5.0 parts by weight of hexamethylene diamine. The process is conducted at the temperature of 140° C. for one hour. The final resin is drained and cooled to the temperature of 30° C. The resin yield is equal to 92%. Properties of the resin and of the article manufactured therefrom are shown in Tables 1 and 2 hereinbelow.

EXAMPLE 8

Under the conditions similar to those described in Example 1 hereinbefore into a reactor there are charged 10 parts by weight of monofurfurylidene acetone, 9.0 parts by weight of novolac phenolformaldehyde resin with the Ubbelohde dropping point of 110° C., 3.5 parts by weight of furfurol and 2% (0.45 part by weight), as calculated for the weight of the starting components, of a catalyst comprising a mixture of 5.0 parts by weight of tin dichloride and 5.0 parts by weight of hexamethylene diamine. The process is conducted at the temperature of 140° C. for one hour. The final resin is drained and cooled to the temperature of 20° C. The resin yield is 91%. Properties of the resin and of the article manufactured therefrom are shown in Tables 1 and 2 hereinbelow.

EXAMPLE 9

Under the conditions similar to those described in the foregoing Example 1 into a reactor there are charged 10 parts by weight of monofurfurylidene acetone, 15 parts by weight of resol phenolformaldehyde resin with the Ubbelohde dropping point of 80° C., 6 parts by weight of tetraethoxysilane, 3 parts by weight of triphenylphosphite and 3% (1.02 parts by weight), as calculated for the weight of the starting components, of a catalyst comprising a mixture of 3.0 parts by weight of tin dichloride and 7.0 parts by weight of hexamethylene diamine. The process is conducted at the temperature of 130° C. for one hour. The final resin is drained and cooled to 15° C. The resin yield is 93%. Properties of the resin and of the articles made therefrom are shown in Tables 1 and 2.

EXAMPLE 10

Under the conditions similar to those described in the foregoing Example 1 into a reactor there are charged 10 parts by weight of a mixture of monofurfurylidene acetone and difurfurylidene acetone in the weight ratio of 7:3 respectively 3 parts by weight of novolac phenolformaldehyde resin with the Ubbelohde dropping point of 135° C., 3 parts by weight of triphenylphosphite, 2 parts by weight of furfurol and 1% (0.18 part by weight), as calculated for the weight of the starting components, of a catalyst comprising a mixture of 7.0 parts by weight of tin dichloride and 3.0 parts by weight of hexamethylene diamine. The process is conducted at the temperature of 140° C. for 1.5 hour. The final resin is drained and cooled to the temperature of 20° C. The resin yield is equal to 92%. Properties of the resin and of the article manufactured therefrom are shown in Tables 1 and 2 hereinbelow.

EXAMPLE 11

Into a reactor similar to that described in the foregoing Example 1 there are charged 10 parts by weight of a mixture of monofurfurylidene acetone and difurfurylidene acetone taken in the weight ratio of 7:5 respectively, 9 parts by weight of resol phenolformaldehyde resin with the Ubbelohde dropping point of 80° C., 4 parts by weight of furfurol, 1 part by weight of triphenylphosphite, 3 parts by weight of tetraethoxysilane and 2% (0.54 part by weight), as calculated for the weight of the starting components, of a catalyst consisting of a mixture of 3.0 parts by weight of tin dichloride and 7.0 parts by weight of hexamethylene diamine. The process is conducted at the temperature of 150° C. for two hours. The final resin is drained and cooled to the temperature of 25° C. The resin yield is 91%. Properties of the resin and of the article manufactured therefrom are shown in Tables 1 and 2.

EXAMPLE 12

Into a reactor similar to that described in Example 1 there are charged 10 parts by weight of a mixture of monofurfurylidene acetone and difurfurylidene acetone taken in the weight ratio of 7:7 respectively, 15 parts by weight of novolac phenolformaldehyde resin with the Ubbelohde dropping point of 95° C., 5 parts by weight of furfurol, 5 parts by weight of triphenylphosphite, 4.5 parts by weight of tetraethoxysilane and 3% (1.125 part by weight), as calculated for the weight of the starting components, of a catalyst consisting of a mixture of 5 parts by weight of tin dichloride and 5 parts by weight of hexamethylene diamine. The process is conducted at the temperature of 180° C. for one hour. The final resin is drained and cooled to the temperature of 30° C. The resin yield is 92%. Properties of the resin and of the article manufactured therefrom are shown in Tables 1 and 2 hereinbelow.

EXAMPLE 13

Into a reactor similar to that of Example 13 there are charged 10 parts by weight of difurfurylidene cyclohexanone, 3 parts by weight of novolac phenolformaldehyde resin with the Ubbelohde dropping point of 135° C., 2 parts by weight of furfurol and 1% (0.15 part by weight), as calculated for the weight of the starting components, of a catalyst comprising a mixture of 7 parts by weight of tin dichloride and 3 parts by weight of hexamethylene diamine. The process is conducted at the temperature of 180° C. for three hours. The final resin is drained and cooled to the temperature of 15° C. The resin yield is equal to 92%. Properties of the resin and of the article manufactured therefrom are shown in Tables 1 and 2.

EXAMPLE 14

Into a reactor similar to that of Example 1 there are charged 10 parts by weight of difurfurylidene cyclohexanone, 9 parts by weight of resol phenolformaldehyde resin with the Ubbelohde dropping point of 80° C., 3.5 parts by weight of furfurol, 0.5 part by weight of triphenylphosphite, 6 parts by weight of tetraethoxysilane and 3% (0.87 part by weight), as calculated for the weight of the starting components, of a catalyst consisting of a mixture of 3 parts by weight of tin dichloride and 7 parts by weight of hexamethylene diamine. The process is conducted at the temperature of 130° C. for the period of two hours. The final resin is drained and cooled to the temperature of 30° C. The resin yield is equal to 93%. Properties of the resin and of the article manufactured therefrom are shown in Tables 1 and 2 hereinbelow.

EXAMPLE 15

Into a reactor similar to that of Example 1 there are charged 10 parts by weight of difurfurylidene cyclohexanone. 15 parts by weight of novolac phenolformaldehyde resin with the Ubbelohde dropping point of 120° C., 5 parts by weight of furfurol, 1.5 parts by weight of triphenylphosphite, 3 parts by weight of tetraethoxysilane and 2% (0.68 part by weight), as calculated for the weight of the starting components, of a catalyst comprising a mixture of 5 parts by weight of tin dichloride and 5 parts by weight of hexamethylene diamine. The process is conducted at the temperature of 200° C. for one hour. The final resin is drained and cooled to the temperature of 20° C. The resin yield is equal to 92%. Properties of the resin and of the article manufactured therefrom are shown in Tables 1 and 2 hereinbelow.

EXAMPLE 16

Into a reactor similar to that of Example 1 there are charged 10 parts by weight of 1,9-di-($\alpha$-furyl)-nonanetetraen-1,3,6,8-one5,3 parts by weight of resol phenolformaldehyde resin with the Ubbelohde dropping point of 95° C., 2 parts by weight of furfurol, 3 parts by weight of triphenylphosphite, 6 parts by weight of tetraethoxysilane and 1% (0.24 part by weight), as calculated for the weight of the starting components, of a catalyst consisting of a mixture of 7 parts by weight of tin dichloride and 3 parts by weight of hexamethylene diamine. The process is conducted at the temperature of 200° C. for 1.5 hours. The final resin is drained and cooled to the temperature of 15° C. The resin yield is equal to 92%. Properties of the resin and of the article manufactured therefrom are shown in Tables 1 and 2 hereinbelow.

EXAMPLE 17

Into a reactor similar to that of Example 1 there are charged 10 parts by weight of 1,9-di-($\alpha$-furyl)-nonanetetraen-1,3,6,8-one-5, 9 parts by weight of novolac phenolformaldehyde resin with the Ubbelohde dropping point of 100° C., 3.5 parts by weight of furfurol, and 2% (0.51 part by weight), as calculated for the weight of the starting components, of a catalyst comprising a mixture of 3 parts by weight of tin dichloride and 7 parts by weight of hexamethylene diamine. The process of conducted at the temperature of 180° C. for two hours. The final resin is drained and cooled to the temperature of 20° C. The resin yield is equal to 93%. Properties of the resin and of the article manufactured therefrom are shown in Tables 1 and 2 hereinbelow.

EXAMPLE 18

Into a reactor there are charged, by following the procedure of the foregoing Example 1, 10 parts by weight of 1,9-di-($\alpha$-furyl)-nonanetetraen-1,3,6,8-one-5, 15 parts by weight of resol phenolformaldehyde resin with the Ubbelohde dropping point of 85° C., 5 parts by weight of furfurol, 0.5 part by weight of triphenylphosphite, 6 parts by weight of tetraethoxysilane and 3% (1.095 parts by weight), as calculated for the starting components, of a catalyst consisting of a mixture of 5 parts by weight of tin dichloride and 5 parts by weight of hexamethylene diamine. The process is conducted at the temperature of 130° C. for the period of 3 hours. The final resin is drained and cooled to the temperature of 30° C. The resin yield is equal to 93%. Properties of the resin and of the article manufactured therefrom are shown in Tables 1 and 2.

EXAMPLE 19

Into a reactor similar to that of Example 1 there are charged 10 parts by weight of 1,5-di-($\alpha$-furyl)-2,4-dimethylpentadien-1,4-one-3, 3 parts by weight of novolac phenol formaldehyde resin with the Ubbelohde dropping point of 95° C., 2 parts by weight of furfurol and 1% (0.15 part by weight), as calculated for the starting components, of a catalyst consisting of a mixture of 7 parts by weight of tin dichloride and 3 parts by weight of hexamethylene diamine. The process is conducted at the temperature of 130° C. for two hours. The resulting resin is drained and cooled to the temperatures of 30° C. The resin yield is equal to 91%. Properties of the resin and of the article manufactured therefrom are shown in the following Tables 1 and 2.

EXAMPLE 20

Into a reactor similar to that described in Example 1 there are charged 10 parts by weight of 1,5-di-($\alpha$-furyl)-2,4-dimethylpentadien-1,4-one-3, 9 parts of resol phenol-formaldehyde resin with the Ubbelohde dropping point of 80° C., 3.5 parts by weight of furfurol, 1.5 parts by weight of triphenylphosphite, 3 parts by weight of tetraethoxysilane and 2% (0.54 part by weight), as calculated for the weight of the starting components, of a catalyst consisting of a mixture of 5 parts by weight of tin dichloride, and 5 parts by weight of hexamethylene diamine. The process is conducted for 1.5 hours at the temperature of 180° C. The resulting resin is drained and cooled to the temperature of 20° C. The resin yield is equal to 93%. Properties of the resin and of the article manufactured therefrom are shown in Tables 1 and 2 hereinbelow.

EXAMPLE 21

Using the equipment and techniques similar to those described in the foregoing Example 1, into a reactor there are charged 10 parts by weight of 1,5-di-($\alpha$-furyl)-2,4-dimethylpentadien-1,4-one-3, 15 parts by weight of novolac phenolformaldehyde resin with the Ubbelohde dropping point of 135° C., 5 parts by weight of furfurol, 3 parts by weight of triphenylphosphite, 6 parts by weight of tetraethoxysilane and 3% (1.17 parts by weight), as calculated for the weight of starting components, of a catalyst consisting of a mixture of 3 parts by weight of tin dichloride and 7 parts by weight of hexamethylene diamine. The process is conducted at the temperature of 200° C. for the period of one hour. The resulting resin is drained and cooled to the temperature of 15° C. The resin yield is equal to 91%. Properties of the resin and of the article manufactured therefrom are shown in Tables 1 and 2 hereinbelow.

EXAMPLE 22

The process is conducted under the conditions similar to those described in Example 5 hereinbefore, except that as the ketone use is made of a mixture of difurfurylidene acetone and difurfurylidene cyclohexanone in the ratio of 5:5 (parts by weight) respectively. Properties of the resin and of the article manufactured therefrom are shown in Tables 1 and 2 hereinbelow.

EXAMPLE 23

The process is conducted under conditions similar to those described in Example 16 hereinbefore, with the only exception that as the ketone use is made of a mixture of difurfurylidene acetone and 1,9-di-(α-furyl)-nonanetetraen-1,3,6,8-one-5 in the ratio of 5:5 (parts by weight) respectively. The properties of the resin and those of the article manufactured therefrom are shown in Tables 1 and 2 hereinbelow.

EXAMPLE 24

The process is conducted under conditions similar to those described in the foregoing Example 21, with the only exception that as the ketone use is made of a mixture of difurfurylidene acetone and 1,5-di-(α-furyl)-2,4-dimethylpentadien-1,4-one-3 in the ratio of 5:5 (parts by weight) respectively. Properties of the resin and of the article manufactured therefrom are shown in Tables 1 and 2.

EXAMPLE 25

The process is conducted under conditions similar to those described in the foregoing Example 3, except only that as the ketone use is made of a mixture of difurfurylidene cyclohexanone and 1,9-(α-furyl)-nonanetetraen-1,3,6,8-one-5 in the ratio of 5:5 (parts by weight) respectively. Properties of the resin and of the article manufactured therefrom are shown in Tables 1 and 2 hereinbelow.

EXAMPLE 26

The process is conducted under conditions similar to those described in Example 13 hereinbefore, with the only exception that as the ketone use is made of a mixture of difurfurylidene cyclohexanone and 1,5-di-(α-furyl)-2,4-methylpentadien-1,4-one-3 in the ratio of 5:5 parts by weight respectively. Properties of the resin and of the article manufactured therefrom are shown in Tables 1 and 2 hereinbelow.

EXAMPLE 27

The process is conducted under conditions similar to those described in Example 17 hereinbefore, with the only exception that as the ketone use is made of a mixture of 1,5-di-(α-furyl)-2,4-dimethylpentadien-1,4-one-3 and 1,9-di-(α-furyl)-nonanetetraene-1,3,6,8-one-5 in the ratio of 5:5 (parts by weight) respectively. Properties of the resin and of the article manufactured therefrom are shown in Tables 1 and 2 hereinbelow.

EXAMPLE 28

The process is conducted under conditions similar to those described in Example 12 hereinabove, with the only exception that as the ketone use is made of a mixture of monofurfurylidene acetone and difurfurylidene acetone in the ratio of 5:5 (parts by weight) respectively. Properties of the resin and of the article manufactured therefrom are shown in Tables 1 and 2 hereinbelow.

EXAMPLE 29

The process is conducted under conditions similar to those described in Example 20 hereinbefore, except that as the ketone use is made of a mixture of monofurfurylidene acetone and 1,9-di-(α-furyl)-nonanetetraen-1,3,6,8-one-5 in the ratio of 5:5 (parts by weight) respectively. Properties of the resulting resin and of the article manufactured therefrom are shown in Tables 1 and 2 hereinbelow.

EXAMPLE 30

The process is conducted under conditions similar to those described in Example 8 hereinbefore, with the only exception that as the ketone use is made of a mixture of monofurfurylidene acetone and 1,5-di-(α-furyl)-2,4-dimethylpentadien-1,4-one-3 in the ratio of 5:5 (parts by weight) respectively. Properties of the resin and of the article manufactured therefrom are shown in Tables 1 and 2 hereinbelow.

Table 1

Properties of the resin produced by the process according to the present invention and that produced by the prior art process

| Procedure for producing the resin according to 1 | Appearance 2 | Solubility in acetone 3 | Ubbelohde melting point, °C. 4 | Ubbelohde dropping point, °C. 5 | Content of hydroxyl groups, % 6 |
|---|---|---|---|---|---|
| Example 1 | Powder of yellow to dark-brown colour | total | 87 | 105 | 2.20 |
| Example 2 | " | " | 102 | 123 | 2.0 |
| Example 3 | " | " | 105 | 129 | 1.90 |
| Example 4 | " | " | 82 | 101 | 1.80 |
| Example 5 | " | " | 104 | 127 | 1.95 |
| Example 6 | " | " | 92 | 115 | 2.1 |
| Example 7 | " | " | 85 | 108 | 1.75 |
| Example 8 | " | " | 90 | 113 | 1.85 |
| Example 9 | " | " | 96 | 120 | 2.5 |
| Example 10 | " | " | 80 | 103 | 1.75 |
| Example 11 | " | " | 85 | 109 | 1.92 |
| Example 12 | Powder of yellow to dark-brown colour | Total | 92 | 117 | 2.35 |
| Example 13 | " | " | 105 | 131 | 1.65 |
| Example 14 | " | " | 109 | 136 | 1.60 |
| Example 15 | " | " | 83 | 105 | 1.70 |

Table 1-continued

Properties of the resin produced by the process according to the present invention and that produced by the prior art process

| Procedure for producing the resin according to | Appearance | Solubility in acetone | Ubbelohde melting point, °C. | Ubbelohde dropping point, °C. | Content of hydroxyl groups, ~% |
|---|---|---|---|---|---|
| 1 | 2 | 3 | 4 | 5 | 6 |
| Example 16 | " | " | 88 | 113 | 1.90 |
| Example 17 | " | " | 91 | 118 | 2.45 |
| Example 18 | " | " | 84 | 109 | 1.95 |
| Example 19 | " | " | 93 | 118 | 2.2 |
| Example 20 | " | " | 99 | 123 | 2.15 |
| Example 21 | " | " | 86 | 109 | 1.9 |
| Example 22 | " | " | 103 | 125 | 2.0 |
| Example 23 | " | " | 85 | 110 | 1.85 |
| Example 24 | " | " | 84 | 106 | 1.92 |
| Example 25 | " | " | 107 | 126 | 1.95 |
| Example 26 | " | " | 104 | 127 | 1.70 |
| Example 27 | " | " | 89 | 110 | 2.50 |
| Example 28 | " | " | 93 | 119 | 2.30 |
| Example 29 | " | " | 97 | 120 | 2.20 |
| Example 30 | " | " | 91 | 115 | 1.90 |
| Prior art process | " | " | 102 | 125 | — |

Table 2

Properties of the article manufactured by the process according to the present invention and by the prior art process

| | | | | Resistance against | | |
|---|---|---|---|---|---|---|
| Articles produced from the resin prepared by the procedure of | Impact resilience, kgf.cm/cm² | Martens yield temperature, °C. | combustibility | 93% sulphuric acid at a temperature of up to 120° C. | 60% nitric acid at a temperature up to 60° C. | Mixture of 50% H₂SO₄ and 30% HNO₃, 20% of water at a temperature of up to 60° C. |
| 1 | 2 | 3 | 4 | 5 | 6 | 7 |
| Example 1 | 3.0 | 270 | combustible | resistant | resistant | resistant |
| Example 2 | 3.2 | 280 | self-extinc- | " | " | " |
| Example 3 | 4.2 | 310 | non-combustible | " | " | " |
| Example 4 | 6.3 | 315 | self-extinction | " | " | " |
| Example 5 | 6.3 | 320 | non-combustible | " | " | " |
| Example 6 | 3.9 | 310 | non-combustible | " | " | " |
| Example 7 | 3.0 | 300 | combustible | " | " | " |
| Example 8 | 3.9 | 300 | combustible | " | " | " |
| Example 9 | 6.3 | 320 | non-combustible | " | " | " |
| Example 10 | 3.9 | 310 | non-combustible | " | " | " |
| Example 11 | 4.3 | 315 | self-extinction | " | " | " |
| Example 12 | 5.3 | 310 | non-combustible | " | " | " |
| Example 13 | 3.9 | 316 | combustible | resistant | resistant | resistant |
| Example 14 | 6.3 | 320 | self-extinction | " | " | " |
| Example 15 | 5.3 | 312 | non-combustible | " | " | " |
| Example 16 | 6.3 | 320 | non-combustible | " | " | " |
| Example 17 | 5.2 | 300 | combustible | " | " | " |
| Example 18 | 6.2 | 320 | self-extinction | resistant | resistant | resistant |
| Example 19 | 3.0 | 295 | combustible | " | " | " |
| Example 20 | 5.4 | 305 | non-combustible | " | " | " |
| Example 21 | 6.3 | 320 | non-combustible | " | " | " |
| Example 22 | 6.3 | 320 | non-combustible | " | " | " |
| Example 23 | 6.2 | 318 | non-combustible | " | " | " |
| Example 24 | 6.3 | 320 | non-combustible | " | " | " |
| Example 25 | 4.3 | 310 | non-combustible | " | " | " |
| Example 26 | 3.8 | 312 | combustible | " | " | " |
| Example 27 | 5.0 | 295 | combustible | " | " | " |
| Example 28 | 5.4 | 312 | non-combustible | " | " | " |
| Example 29 | 5.3 | 308 | non-combustible | " | " | " |
| Example 30 | 3.8 | 302 | combustible | " | " | " |
| Prior art | | | | limitedly | | |

Table 2-continued

Properties of the article manufactured by the process according to the present invention and by the prior art process

| Articles produced from the resin prepared by the procedure of | Impact resilience, kgf.cm/cm$^2$ | Martens yield temperature, °C. | combustibility | Resistance against | | |
|---|---|---|---|---|---|---|
| | | | | 93% sulphuric acid at a temperature of up to 120° C. | 60% nitric acid at a temperature up to 60° C. | Mixture of 50% H$_2$SO$_4$ and 30% HNO$_3$, 20% of water at a temperature of up to 60° C. |
| 1 | 2 | 3 | 4 | 5 | 6 | 7 |
| process | 2.5 | 250 | combustible | resistant | non-resistant | non-resistant |

What we claim is:

1. A process for producing a powder-like furan resin comprising heating of the starting components, viz. a ketone of the furan series and phenolformaldehyde resin taken in amounts ensuring a weight ratio therebetween of 10:3–15 respectively, to a temperature within the range of from 130° to 200° C.

2. A process for producing a powder-like furan resin as claimed in claim 1, wherein temperature of heating of the starting components is varied from 180° to 200° C.

3. A process for producing a powder-like furan resin as claimed in claim 1, wherein as the ketone of the furan series use is made of compounds selected from the group consisting of monofurfurylidene acetone, difurfurylidene acetone, a mixture of monofurfurylidene acetone and difurfurylidene acetone taken in a weight ratio of from 7:3 to 7:7, difurfurylidene cyclohexanone, 1,9-di-(α-furyl)-nonanetetraen-1,3,6,8-one-5, 1,5-di-(α-furyl)-2,4-dimethylpentadien-1,4-one-3 and mixtures thereof.

4. A process for producing a powder-like furan resin as claimed in claim 1 which is performed in the presence of triphenylphosphite taked in a weight ratio to the ketone of the furan series ranging from 10:0.5 to 10:3 respectively.

5. A process for producing a powder-like furan resin as claimed in claim 1, which is performed in the presence of tetraethoxysilane taken in a weight ratio to the ketone of the furan series ranging from 10:3 to 10:6 respectively.

6. A process for producing a powder-like furan resin as claimed in claim 1, wherein the reaction is conducted in the presence of furfurol at a weight ratio of the ketone of the furan series, phenolformaldehyde resin and furfurol equal to 10:3–15:2–5 respectively and upon heating at a temperature within the range of from 130° to 180° C.

7. A process for producing a powder-like furan resin as claimed in claim 6, wherein as the starting components use is made of a ketone of the furan series, phenolformaldehyde resin and furfurol taken in amounts ensuring the weight ratio of said components equal to 10:5:5 respectively; the heating being conducted at a temperature within the range of from 130° to 140° C.

8. A process for producing a powder-like furan resin as claimed in claim 6, which is performed in the presence of triphenylphosphite taken in a weight ratio to the ketone of the furan series ranging from 10:0.5 to 10.3 respectively.

9. A process for producing a powder-like furan resin as claimed in claim 6, which is conducted in the presence of tetraethoxysilane taken in a weight ratio to the ketone of the furan series ranging from 10:3 to 10:6 respectively.

10. A process for producing a powder-like furan resin as claimed in claim 1, wherein said heating is performed in the presence of 1 to 3% by weight (as calculated for the weight of the starting components) of a catalyst comprising a mixture of tin dichloride and hexamethylene diamine taken in a weight ratio of from 7:3 to 3:7 respectively.

* * * * *